United States Patent [19]
Rolleston et al.

[11] Patent Number: 5,528,386
[45] Date of Patent: Jun. 18, 1996

[54] COLOR PRINTER CALIBRATION ARCHITECTURE

[76] Inventors: Robert J. Rolleston, 82 Clearview Dr., Penfield, N.Y. 14526; Martin S. Maltz, 25 Dunrovin La., Rochester, N.Y. 14618; Judith E. Stinehour, 150 Fairhaven Rd., Rochester, N.Y. 14610

[21] Appl. No.: 179,284

[22] Filed: Jan. 10, 1994

Related U.S. Application Data

[62] Division of Ser. No. 955,075, Oct. 1, 1992, Pat. No. 5,305,119.

[51] Int. Cl.$^6$ ..................................................... H04N 1/46
[52] U.S. Cl. ........................... 358/522; 358/529; 358/518; 358/519
[58] Field of Search .................................. 358/522, 523, 358/524, 529, 530, 518, 519, 296, 298

[56] References Cited

U.S. PATENT DOCUMENTS 4,346,402  8/1982  Pugsley ..................................... 358/523
4,482,917  11/1984 Gaulke et al. ............................. 358/518
4,891,692  1/1990  Outa ........................................ 358/522
4,928,167  5/1990  Tatsumi et al. .......................... 358/522

Primary Examiner—Stephen Brinich
Assistant Examiner—Jerome Grant, II

[57] ABSTRACT

In a printer which produces images as a function of the combination of cyan (C), magenta (M), yellow (Y) and black (K) colorants on an output color print, responsive to device independent colorimetric description of an image, there is provided a method of calibrating the response of the printer to an image described in terms of colorimetric values, including the steps of first, gray balancing or linearizing colorant signals; secondly, adding black to an ideal device dependent description of a color image in accordance with a predetermined black addition process, and thirdly, providing a color correction transformation process, where the color correction transformation is accomplished via a method of interpolating printer responses from a look-up table indexing colorimetric descriptions of measured real responses, which take into account subsequent black addition and signal linearization.

9 Claims, 3 Drawing Sheets

EXPECTED

WITH K+

COLOR PRINTER CALIBRATION ARCHITECTURE

This is a division of application Ser. No. 07,955,075, filed Oct. 1, 1992, now U.S. Pat. No. 5,305,119.

The present invention is directed to a printer calibration system for calibrating a printer to produce an accurate printer response based on a given ideal input image, and more particularly to a calibration architecture which allows device independent color image description conversion to device dependent descriptions that produce an accurate printer response.

INCORPORATION BY REFERENCE

The following patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system. The following articles are also hereby incorporated by reference: Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanners typically operate with colors defined in a color space of tristimulus values, i.e., RGB (red-green-blue). Commonly, these values are a linear transformation of the standard XYZ coordinates of CIE color space, or another transform of those values.

Printers have an output which can be defined as existing in a color space called CMYK (cyan, magenta, yellow, key or black) which is uniquely defined for the printer by its capabilities and colorants. Printers operate by the addition of multiple layers of ink or colorant in layers or halftone dots to a page. The response of the printer tends to be non-linear. Thus, while a printer receives information in a first color space which has values defined independently of any device, it must convert that information to print in a second color space which is dependent of device characteristics.

The desirability of operating in a tristimulus color space with subsequent conversion to a printer colorant color space is well known, as shown by U.S. Pat. No. 4,500,919 to Schreiber, U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

The calibration of a printer involves the process of finding what set of signals must be sent to a printer to obtain a desired color. The desired color is described in some device independent terminology (i.e. some well defined standard), and the signals to the printer constitute a device dependent terminology. A complete calibration will transform the device independent color description into a device dependent description such that the resultant combination of materials (i.e. ink, toner, dye, etc.) on the paper produces the desired color (i.e. the color which was initially described in a device independent fashion).

The calibration of high quality printers can be divided into three major tasks, (1) setting gray balance (denoted by GB), (2) determining black addition (sometimes K+) and under color removal (termed UCR or sometimes termed "gray component replacement"); and finally (3) color correction or color transformation.

Gray balance consists of determining what combination of inks are needed to produce a neutral gray of a desired density. Since black ink is neutral, only the combination of CMY inks must be determined. The black channel of the printer is linearized such that the reflectance from black ink is a linear function of the input signal. Because of unwanted absorption, printer non-linearities and other effects, it is generally not the case that equal amounts of CMY ink will produce a neutral color, but it is useful to define a CMY signal for which this is the case. When the gray balanced printer is given equal amounts of CMY as input signals, it will put down the amounts of cyan, magenta, and yellow ink that is needed to produce a neutral color. This generally means that the ink amounts on paper will not be equal, but the final color will be neutral.

The procedure for gray balancing a printer involves printing many different combinations of CMY ink, and then inspecting the resulting patches to find the neutral colors. Then, the neutral patches are found by measuring the color of the patches (there may be an initial visual sort of the patches). Hopefully, neutral patches of different densities are obtained, and then a curve fitting procedure is used to predict the ink combinations needed for the other obtainable neutral grays. The difficulty with this procedure is the printing and inspection of many patches, and that it requires the production, searching, and predicting to take place in a three dimensional space.

The process known as UCR involves determining how much CMY ink to remove after a specified amount of black ink has been added to the same color. The idea here is to replace some of the CMY ink with black ink. Black ink is used to both extend the gamut of the printer, which aids in the production of sharper, cleaner looking images, and to reduce the total amount of ink on the page.

The procedure for determining the amount of UCR is a strong function of black addition. An example of one such black addition strategy is that of adding no black up until some minimum density, and then slowly adding more black as the density of the requested color increases. In one possible calibration strategy, the amount of black ink is zero until some minimum density, and then increases quadratically as a function of requested density.

One method of color calibration requires first performing a gray balance calculation of the printer, followed by a determining K+ and UCR, and finally making a determination of a color correction transform. The gray balance process requires searching through a three dimensional table, with interpolation to find a proper combination of inks to produce a neutral color. The second stage of the calibration requires the choice of an initial K+ strategy and then the measurement of printed patches to modify the K+ strategy and determine a UCR strategy. The final stage of the calibration requires the establishment of a color correction transformation. This is currently done by printing and measuring 1000 (10×10×10) or 512 (8×8×8) patches distributed throughout the color space. These patches are used to build a three dimensional look-up-table (LUT) which is used with tetrahedral interpolation. In the long calibration process, the table should only have to make minor corrections to the colors; grays should already be gray (because of the gray balance calibration), and the colors should not change significantly in density (because the UCR calibration has been done).

In U.S. Pat. No. 4,500,919 to Schreiber, and U.S. Pat. No. 4,275,413 to Sakamoto, the information derived from patch measuring was placed into look-up tables, stored in a memory, perhaps ROM memory or RAM memory where the look-up table relates input color space to output color space. The look-up table is commonly a three dimensional table since color space is three dimensional. With a scanner or computer, the RGB space can be defined as three dimensional with black at the origin of a three dimensional coordinate system (0,0,0), and white at the maximum of a three dimensional coordinate system which an 8-bit system would be located at (255, 255, 255). Each of the three axes radiating from the origin point therefore respectively define red, green, and blue. A similar construct can be made for the printer, with axes representing cyan, magenta, and yellow. Black is usually a separate toner which is added separately. In the 8-bit system suggested there will be, however, over 16 million possible colors ($256^3$). There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1,000, or even less. Therefore, the look-up tables consist of a set of values which could be said to be the intersections for corners of a set of rectangular parallel-pipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

All of the references cited herein are incorporated by reference for their teachings.

SUMMARY OF THE INVENTION

In accordance with the invention, in a printer which produces images as a function of the combination of cyan (C), magenta (M), yellow (Y) and black (K) colorants on an output print, there is provided a simplified calibration process providing accurate printer response to ideal input.

In accordance with one aspect of the invention, in a printer which produces images as a function of the combination of cyan (C), magenta (M), yellow (Y) and black (K) colorants on an output print, responsive to device independent colorimetric description of an image, there is provided a method of calibrating the response of the printer to an image described in terms of colorimetric values, including the steps of first, determining a gray balanced or linear printer response; second, adding black to an ideal device dependent description of a color image in accordance with a predetermined black addition process, and third, providing a color correction transformation process, where the color correction transformation is accomplished via a method of interpolating printer responses from a look up table indexing colorimetric descriptions of measured real responses, including correction for gray density and under color removal.

In accordance with another aspect of the invention, the table relating device independent image descriptions to device dependent image descriptions is generated, with the entries to the table taking into account the gray balanced or linearized response of the printer, desirable undercolor removal, and downstream black addition to the device dependent color description of the image.

In accordance with yet another aspect of the invention, there is provided a method of calibrating a color printer so that color images defined in terms of colorimetric color signals may be printed on a color printer responsive to printer colorant signals to render color prints with a set of three primary colorants and black on a substrate, the calibration method comprising the ordered steps of:

a) gray balancing or linearizing the printer response;

b) determining, for a given density characteristic of a combination of primary colorant signals to generate a color on the substrate, a black colorant signal, to add black to a color print;

c) producing a color transform and correction table; and d) storing an addressable mapping of colorimetric color signals to colorant signals in a printer memory.

In accordance with still another aspect of the invention, there is provided a method of printing in a calibrated color printer so that scanned color images defined in terms of colorimetric color signals may be printed on a color printer responsive to printer colorant signals to render a color print with a set of three primary colorants and black on a substrate, and including undercolor removal, the printing method comprising the ordered steps of:

scanning an image to derive a set of device independent colorimetric color signals;

converting said colorimetric color signals into device dependent primary colorant signals, each primary colorant signal defining a density of colorant to be used in rendering a color print, said conversion accounting for a subsequent black colorant addition;

determining, for a density of the combination of primary colorant signals a black colorant signal, to add black colorant to the color print;

gray balancing or linearizing the primary colorant signals and linearizing black to generate a set of corresponding printer colorant signals to control the printer; and using said printer colorant signals to control the printer to produce an image colorimetrically matching the scanned image.

These and other aspects of the invention will become apparent from the following descriptions to illustrate a preferred embodiment of the invention read in conjunction with the accompanying drawings in which.

Figure 1:
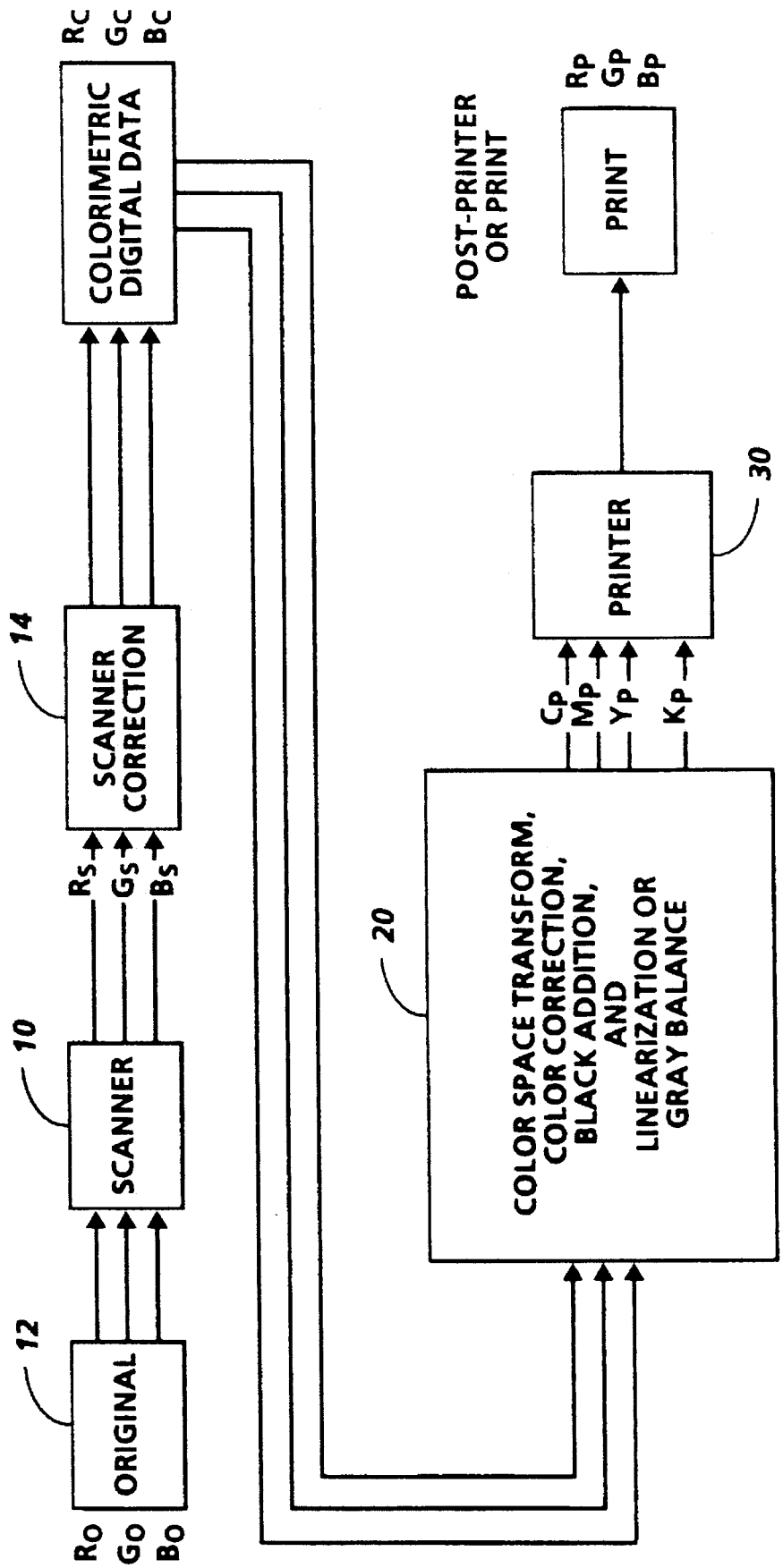
FIG. 1 is a block diagram of a scanning/printing system with color transformation, for converting device independent image descriptions to device dependent image descriptions.

Referring now to the drawings where the showings are for the purpose of describing an embodiment of the invention and not for limiting same, a basic system for carrying out the present invention is shown in FIG. 1. In a simple system model, a scanner 10, such as perhaps the color scanner available in the Xerox 5775 digital color copiers, which can be calibrated to produce a set of digital colorimetric or device independent data describing a scanned image 12, which, by definition can be defined in terms of r g b space. Resulting from the scanning operation is a set of scanner image signals $R_s, G_s, B_s$, defined in device dependent scanner terms. Incorporated into the scanner or another processing path is a post-scanning processor 14, which provides correction of scanner image signals $R_s, G_s, B_s$ to colorimetric terms, typically digital in nature $R_c, G_c, B_c$. The values may be in terms of CIE color space (rgb), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values $C_p, M_p, Y_p, K_p$ that will be used to drive a printer 30. In one possible example, the colorant values represent the relative amounts of cyan, magenta and yellow toners that are to be deposited over a given area in an electrophotographic printer, such as, again, Xerox 5775 digital color copiers. The printed output image may be said to be defined in terms of $R_p, G_p, B_p$, which is hoped to have a relationship with $R_o, G_o, B_o$ such that the printer has a color that is colorimetrically similar to the original image, although that similarity is ultimately dependent upon the gamut of the printing device.

Figure 2:
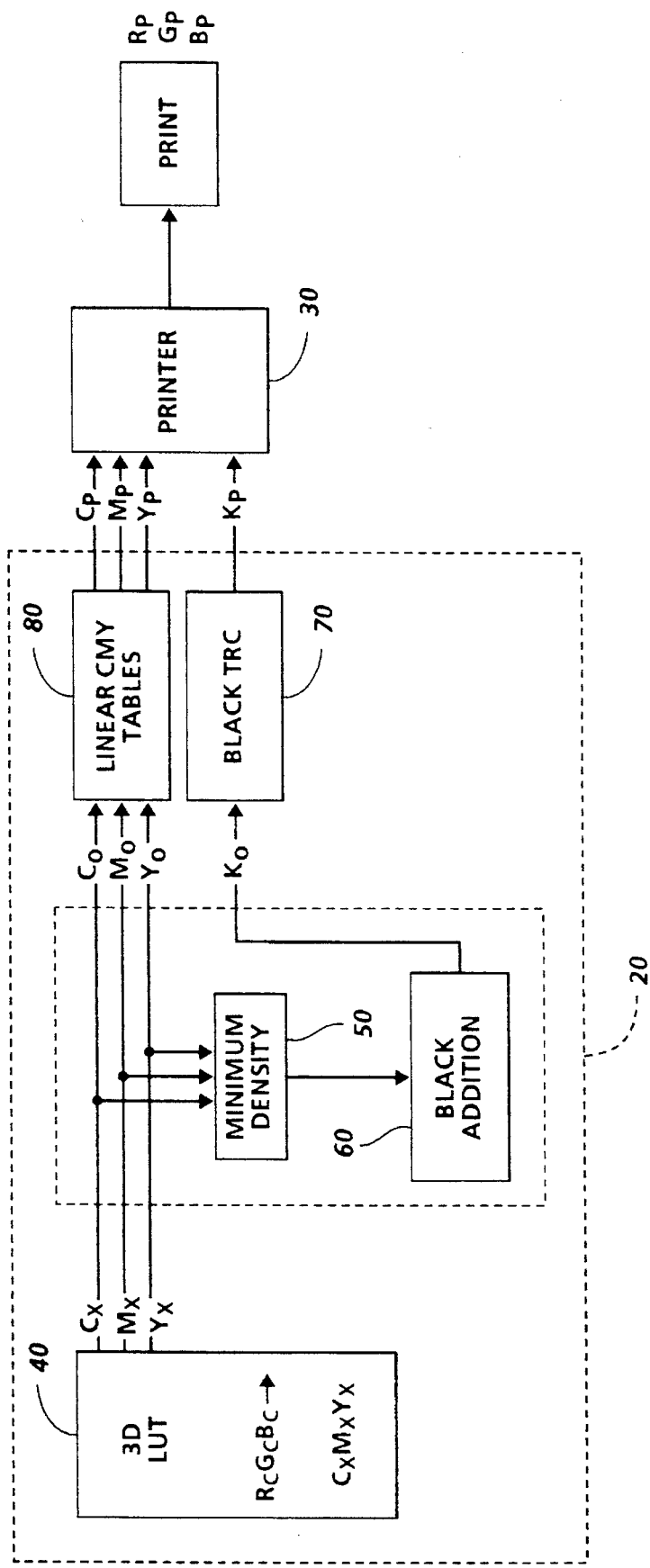
FIG. 2 is a block diagram of a portion of the printing system of FIG. 1, showing modification of the device dependent image descriptions to accommodate an individual printer.

With reference now to FIG. 2, and color space transformation and color correction 20, initially, $R_c$, $G_c$, $B_c$ color signals are directed to a three dimensional look up table stored in a device memory such as a ROM or other addressable memory device, which will meet speed and memory requirements for a particular device. Color signals $R_c$, $G_c$, $B_c$ are processed to generate address entries to the table which stores a set coefficients with which the $R_c$, $G_c$, $B_c$ may be processed to convert them to $C_x$, $M_x$, $Y_x$ colorant signals. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324. The construction of the set of values stored for the present invention will be discussed hereinbelow.

With reference again to FIG. 2, upon obtaining device dependent colorant signals $C_x$, $M_x$, $Y_x$, black addition (K+) is performed in two steps. In the first step 50 the minimum density of the cyan, magenta, and yellow signals is determined. In the second step 60 it then generates a black colorant signal as a function thereof. As discussed, in one possible embodiment, the amount of black ink is zero until some minimum density, and then increases quadratically as a function of requested density. The addition of black ink is primarily an aesthetic determination.

Subsequent to black addition, the color values are linearized, so that linearly increasing values of colorants produce a linearly increasing colorimetric response. The linearization process is implemented via a set of look-up tables storing the responses of a set of patches generated at a set of input values, where a curve fitting routine is used to map the set of possible input responses to characterized output responses. These values are then used to drive printer 30.

In an alternative embodiment of the invention, rather than linearizing the color values, so that linearly increasing values of colorants produce a linearly increasing colorimetric response, the color values may be gray balanced, so that equal amounts of color produce a neutral gray response at the printer. The gray balance process is implemented via a set of look-up tables storing the responses of a set of patches generated at a set of input values, where a curve fitting routine is used to map the set of possible input responses to characterized output responses. These values are then used to drive printer 30.

To create the color transformation table requires: 1) linearization or gray balance of printer responses; 2) determination of black addition strategy; and 3) printing a set of patches with a selected set of input values, taking into account linearization or gray balance and black addition. To create the table, a set of color patches are created, which include determined linearization and black addition. This is done by printing and measuring about 1000 (10×10×10) or 512 (8×8×8) patches of printer colors distributed throughout the color space, i.e., a large set of printer driving signals are generated, in varying densities of combinations of cyan, magenta and yellow, and used to drive the printer. The color of each patch is measured, using a spectrophotometer to determine color in terms of $R_cB_cG_c$. The measured colors of these patches are used to build a three dimensional look-up-table (LUT) relating $R_cB_cG_c$-defined colors to $C_xM_xY_x$ defined colors. Conversions that do not include mapped and measured points may be interpolated.

As was noted, the actual patch printed is a combination of cyan, magenta, yellow and black colorants, where black is added in accordance with a black addition strategy. Additionally, the response of the printer to signals for each color and black was linearized or gray balanced. Given a color patch created with 50% cyan, 50% magenta, 50% yellow (where the percentage of color refers to the percentage of possible density of that color), which should be approximately a neutral gray, perhaps 30% black will be added. Additionally, the signals will be linearized by look-up tables 70 and 80. When measured, however, the patch color will be significantly darker than one might expect, due to the black addition. Therefore, the $R_cB_cG_c$ value mapped to that combination of 50% cyan, 50% magenta, 50% yellow and 30% black has a much higher density than would be expected. A corollary is that the amount of cyan, magenta, and yellow being used is less than would be expected for the desired $R_cB_cG_c$ density. Thus, it can be seen that the amount of cyan, magenta, and yellow is lowered to compensate for the amount of black added, and UCR is accomplished without a UCR determination step.

Figure 3A:
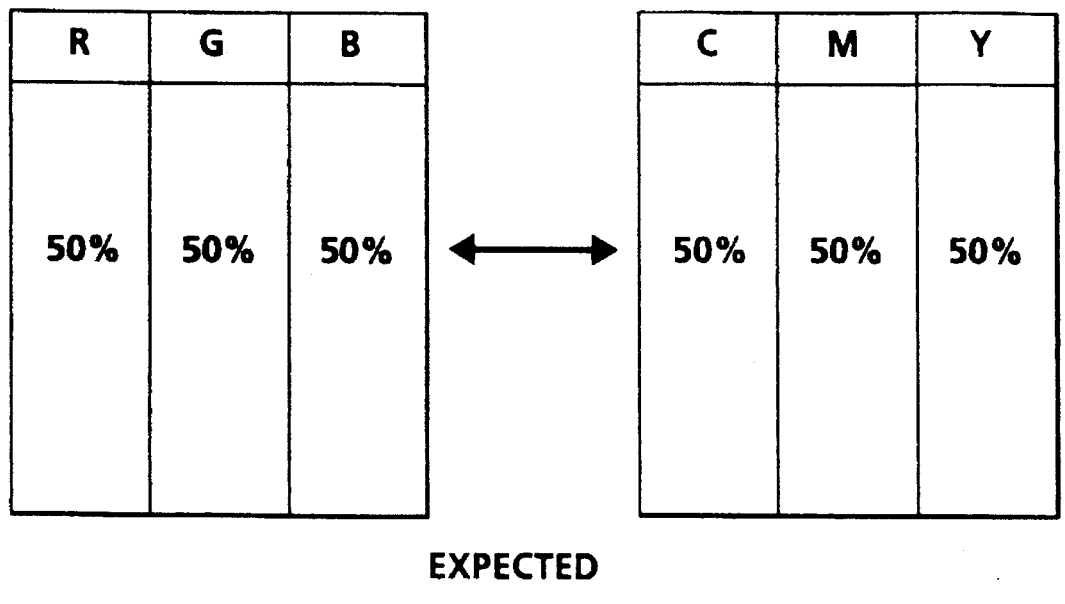
FIGS. 3A and 3B show the effect of the invention on color conversion look-up tables.
Figure 3B:
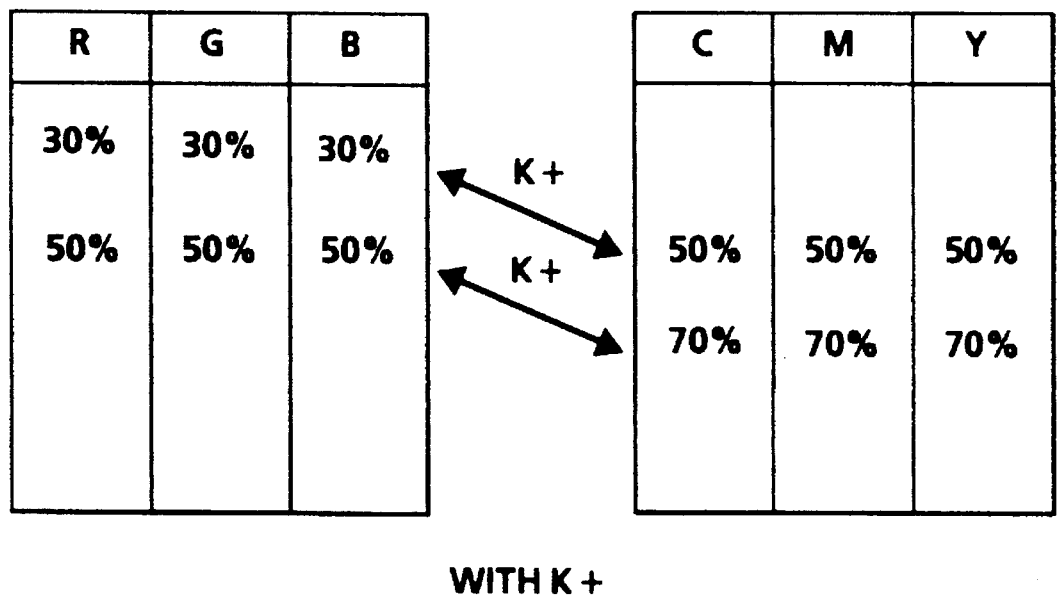

FIG. 3 provides a brief explanation. In FIG. 3A, a 3-D look-up table indexing $R_cB_cG_c$ reflectance values to CMY reflectance values may provide the relationship shown. Thus, a specified $R_cB_cG_c$ signal produces a corresponding CMY signal. However, if black is added, the measured RGB for the same CMY is much darker. Accordingly, to obtain the same RGB of FIG. 3A, in FIG. 3B, a lighter combination of CMY must be used. In other words, converting from device independent values to device dependent values, in converting from RGB to CMY, the conversion must provide for a lighter combination of CMY. The less dense combination of colorants accomplishes UCR.

The same measurements made and stored that account for UCR also account for gray balance or linearization determination, since the table generation includes the response of the printer after compensation for gray balance or linearization.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of calibrating a color printer so that color images defined in terms of colorimetric color signals may be printed on a color printer responsive to printer colorant signals to render color prints with a set of three primary colorants and black on a substrate, the calibration method comprising the ordered steps of:

a) linearizing the printer response by:
      i) producing a set of printer colorant signals to print a corresponding test pattern set of varying density samples of each of the three primary colorants and black on a substrate,
      ii) measuring the density of each printed density sample, and
      iii) generating a printer linearization table for each of the three primary colorants and black, whereby a linear increase in a colorant signal produces a linear increase in a printer colorant signal;

b) determining, for a given density characteristic of a combination of primary colorant signals to generate a color on the substrate, a black colorant signal, to add black to a color print;

c) producing a color transform and correction table by:
      i) producing a second set of printer colorant signals of colors from combinations of the three primary colorants, with black colorant signals added in accordance with the determined density characteristic of the combination of primary colorant signals, to print a corresponding second test pattern set of color samples from combination of the three primary colorants and black on a substrate,
      ii) measuring the color of each printed color sample in terms of colorimetric color signals, and
      iii) generating a color transformation table mapping measured colors in terms of the three primary colorants used to generate the color samples to colorimetric color signals;

d) storing an addressable mapping of colorimetric color signals to colorant signals in a printer memory.

2. A method as defined in claim 1, and including the further step, after determining the black colorant signal, and prior to producing a color transform and correction table, determining an amount by which each colorant can be correspondingly reduced for under color removal.

3. A method as defined in claim 1, and including the further step, after linearizing the printer response, and prior to producing a color transform and correction table, of:

gray balancing the printer response by:
      i) producing a set of printer colorant signals to print a corresponding set of varying density samples of combinations each of the three primary colorants;
      ii) determining which of the samples printed in combination provide a neutral gray;
      iii) generating a printer gray balance table, whereby printer colorant signals are varied in accordance with a function that defines three equal colorant signals as gray;
      iv) producing a set of printer colorant signals to print varying density samples of black on a substrate;
      v) measuring the density of each printed sample.

4. A method as defined in claim 3, and including the further step, after determining the black colorant signal, and prior to producing a color transform and correction table, determining an amount by which each colorant can be correspondingly reduced for under color removal.

5. A method of calibrating a color printer so that color images defined in terms of colorimetric color signals may be printed on a color printer responsive to printer colorant signals to render color prints with a set of three primary colorants and black on a substrate, the calibration method comprising the ordered steps of:

a) gray balancing the printer response by:
      i) producing a set of printer colorant signals to print a corresponding set of varying density samples of combinations each of the three primary colorants;
      ii) determining which of the samples printed in combination provide a neutral gray;
      iii) generating a printer gray balance table, whereby printer colorant signals are varied in accordance with a function that defines three equal colorant signals as gray;
      iv) producing a set of printer colorant signals to print varying density samples of black on a substrate;
      v) measuring the density of each printed sample, and
      vi) generating a printer linearization table for black, whereby a linear increase in the colorant signal for black produces a linear increase in the black printer colorant response;

b) determining, for a given density characteristic of a combination of primary colorant signals to generate a color on the substrate, a black colorant signal, to add black to a color print;

c) producing a color transform and correction table by:
      i) producing a second set of printer colorant signals of colors from combinations of the three primary colorants, with black colorant signals added in accordance with the determined density characteristic of the combination of primary colorant signals, to print a corresponding set of color samples from combination of the three primary colorants and black on a substrate,
      ii) measuring the color of each printed color sample in terms of colorimetric color signals, and
      iii) generating a color transformation table mapping measured colors in terms of the three primary colorants used to generate the color samples to colorimetric color signals;

d) storing an addressable mapping of colorimetric color signals to colorant signals in a printer memory.

6. A method as defined in claim 5, and including the further step, after determining the black colorant signal, and prior to producing a color transform and correction table, determining an amount by which each colorant can be correspondingly reduced for under color removal.

7. A method of calibrating a color printer so that color images defined in terms of colorimetric color signals may be printed on a color printer responsive to printer colorant signals to render color prints with a set of three primary colorants on a substrate, the calibration method comprising the ordered steps of:

a) linearizing the printer response by:
   i) producing a set of printer colorant signals to print a corresponding test pattern set of varying density samples of each of the three primary colorants on a substrate,
   ii) measuring the density of each printed density sample, and
   iii) generating a printer linearization table for each of the three primary colorants, whereby a linear increase in a colorant signal produces a linear increase in a printer colorant signal;

b) producing a color transform and correction table by:
   i) producing a second set of printer colorant signals of colors from combinations of the three primary colorants, with black colorant signals added in accordance with the determined density characteristic of the combination of primary colorant signals, to print a corresponding test pattern set of color samples from a combination of the three primary colorants and black on a substrate,
   ii) measuring the color of each printed color sample in terms of colorimetric color signals, and
   iii) generating a color transformation table mapping measured colors in terms of the three primary colorants used to generate the color samples to colorimetric color signals;

c) storing an addressable mapping of colorimetric color signals to colorant signals in a printer memory.

8. A method of calibrating a color printer so that color images defined in terms of colorimetric color signals may be printed on a color printer responsive to printer colorant signals to render color prints with a set of three primary colorants on a substrate, the calibration method comprising the ordered steps of:

a) gray balancing the printer response by:
   i) producing a set of printer colorant signals to print a corresponding set of varying density samples of combinations each of the three primary colorants;
   ii) determining which of the samples printed in combination provide a neutral gray;
   iii) generating a printer gray balance table, whereby printer colorant signals are varied in accordance with a function that defines three equal colorant signals as gray;
   iv) measuring the density of each printed sample, and b) producing a color transform and correction table by:
   i) producing a second set of printer colorant signals of colors from combinations of the three primary colorants, with black colorant signals added in accordance with the determined density characteristic of the combination of primary colorant signals, to print a corresponding set of color samples from a combination of the three primary colorants and black on a substrate,
   ii) measuring the color of each printed color sample in terms of colorimetric color signals, and
   iii) generating a color transformation table mapping measured colors in terms of the three primary colorants used to generate the color samples to colorimetric color signals;

c) storing an addressable mapping of colorimetric color signals to colorant signals in a printer memory.

9. A method as defined in claim 8, and including the further step, prior to producing a color transform and correction table, of gray balancing the printer response by:
   i) producing a set of printer colorant signals to print a corresponding set of varying density samples of combinations each of the three primary colorants;
   ii) determining which of the samples printed in combination provide a neutral gray;
   iii) generating a printer gray balance table, whereby printer colorant signals are varied in accordance with a function that defines three equal colorant signals as gray;
   iv) measuring the density of each printed sample.

* * * * *